United States Patent
Ayglon et al.

(10) Patent No.: US 12,370,836 B2
(45) Date of Patent: Jul. 29, 2025

(54) TREAD HAVING TURN AROUND SIPE

(71) Applicants: COMPAGNIE GENERALE DES ETABLISSEMENTS MICHELIN, Clermont-Ferrand (FR); Virgile Ayglon, Simpsonville, SC (US); Daniel McEachern Hicks, Greenville, SC (US); Tyler Sites, Greenville, SC (US)

(72) Inventors: Virgile Ayglon, Simpsonville, SC (US); Daniel McEachern Hicks, Greenville, SC (US); Tyler Sites, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 9 days.

(21) Appl. No.: 18/554,125

(22) PCT Filed: Jun. 29, 2021

(86) PCT No.: PCT/US2021/039477
§ 371 (c)(1),
(2) Date: Oct. 5, 2023

(87) PCT Pub. No.: WO2023/277867
PCT Pub. Date: Jan. 5, 2023

(65) Prior Publication Data
US 2024/0208271 A1 Jun. 27, 2024

(51) Int. Cl.
*B60C 11/12* (2006.01)
*B60C 11/03* (2006.01)

(52) U.S. Cl.
CPC ...... *B60C 11/1204* (2013.01); *B60C 11/0302* (2013.01); *B60C 11/1281* (2013.01);
(Continued)

(58) Field of Classification Search
CPC ............ B60C 11/1204; B60C 11/1281; B60C 11/0302; B60C 2011/1213; B60C 2011/0348; B60C 2011/0397
See application file for complete search history.

(56) References Cited

U.S. PATENT DOCUMENTS

D168,030 S  * 10/1952  Hawkinson ................. D12/563
4,480,671 A * 11/1984  Giron ..................... B60C 11/01
152/209.27

(Continued)

FOREIGN PATENT DOCUMENTS

EP  0547019 A1  6/1993
GB  1265652 A  * 3/1972
(Continued)

OTHER PUBLICATIONS

Machine translation for Japan 2017-109506 (Year: 2024).*
(Continued)

*Primary Examiner* — Steven D Maki
(74) *Attorney, Agent, or Firm* — Neal P. Pierotti

(57) ABSTRACT

A heavy truck tire tread that has a shoulder rib and shoulder groove is provided. A sipe is in the shoulder rib that extends from the shoulder groove to the lateral outer surface. A first end of a teardrop of the sipe is located at the lateral outer surface, and a second end at the shoulder groove. A middle section of the teardrop is located between the first and second ends in the lateral direction. A first transition is located between the first end and the middle section, and a second transition is located between the second end and the middle section and they both extend in the lateral and thickness directions. The entire middle section is farther from the upper surface in the thickness direction than any portion of the first or second ends are to the upper surface in the thickness direction.

12 Claims, 7 Drawing Sheets

(52) U.S. Cl.
CPC ............... *B60C 2011/0348* (2013.01); *B60C 2011/0397* (2013.01); *B60C 2011/1213* (2013.01); *B60C 2011/1254* (2013.01); *B60C 2200/06* (2013.01)

(56) References Cited

U.S. PATENT DOCUMENTS

| | | | |
|---|---|---|---|
| 6,488,064 B1 * | 12/2002 | Radulescu | .......... B60C 11/1281 152/209.27 |
| 10,919,342 B2 | 2/2021 | Mosnier et al. | |
| 2017/0341471 A1 * | 11/2017 | Yurjevich | .......... B60C 11/1281 |

FOREIGN PATENT DOCUMENTS

| | | | | |
|---|---|---|---|---|
| JP | 01-101205 A | * | 4/1989 | |
| JP | H11 78433 A | | 3/1999 | |
| JP | 2000-255220 A | * | 9/2000 | |
| JP | 2017-109506 A | * | 6/2017 | |
| WO | WO-2020-102350 A1 | * | 5/2020 | ......... B60C 11/0302 |

OTHER PUBLICATIONS

Machine translation for Japan 2000-255220 (Year: 2024).*
Machine translation for Japan 01-101205 (Year: 2024).*
European Patent Office, International Search Report and Written Opinion, dated Apr. 4, 2022, pp. 1-09 (included), European Patent Office, Rijswijk, The Netherlands.

* cited by examiner

TREAD HAVING TURN AROUND SIPE

CROSS-REFERENCE TO RELATED APPLICATIONS

The present application is a 35 U.S.C. § 371 application of PCT/US2021/039477 filed on Jun. 29, 2021 and entitled "Tread Having Turn Around Sipe" and claims benefit thereto. The entire contents of PCT/US2021/039477 are incorporated by reference herein in their entirety for all purposes.

FIELD OF THE INVENTION

The subject matter of the present invention relates to sipes for tires that feature a sipe that has a certain geometry that may help maintain wear, aggression, rolling resistance, and end of service traction. More particularly, the present application involves a sipe proximate to a tread edge that has five segments arranged in a particular manner such that some of the sipes are at different angles relative to the lateral direction.

BACKGROUND OF THE INVENTION

Tires normally include tread that has a series of ribs that extend in a circumferential direction of the tire separated in the axial direction by grooves. The ribs can be provided with a series of sipes that function to improve traction in certain road conditions. The sipes are thin slits cut into the ribs and can be made in a variety of manners. For instance, the shape along the lengths of the sipes may be straight, zig-zag, undulating, or angled into the tire elements. The sipe depths may also vary or be consistent along their lengths, and may extend into the tread all the way to the end of life tread depth. The sipes may close within the tire "footprint" on the road, and can increase the flexibility of the tread block into which the sipes are located. The presence of sipes can improve stopping distance, breakaway traction, and rolling traction on glare ice. Additionally sipes have been found to improve traction for tires in snow, mud, and other types of ice.

It is known to provide sipes with a teardrop shape that tends to increase traction of the tire when the tire is near the end of its life. The teardrop feature in the sipe is an increase in the circumferential length of the sipe at an area of the sipe closer to the center of the tire in the radial direction. This increase in circumferential length causes the sipe to have a larger void radially closer to the tire center than portions of the sipe radially farther from the tire center. When the tire tread wears down, the larger void portion will open up and be exposed to the road surface and will improve traction and water removal when the tire is nearing the end of its life.

Although the inclusion of sipes helps improve tire performance in certain areas, the addition of these cut features into the ribs of the tire may also cause a risk of irregular wear on the ribs, increased rolling resistance, degradation in sculpture robustness, and a risk of increased chipping and tearing. Sipes that are present in shoulder ribs of heavy commercial truck tires may cause irregular wear and sipe aggression. Sipe aggression is the cracking or tearing of the shoulder rib due to a stress concentration caused by the sipe. When a drive tire experiences torque, cracking in the shoulder rib may occur at the bottom of the teardrop and subsequently extend away from this initiation site.

A known approach to prevent or minimize cracking at the bottom of the sipe is to provide a teardrop that has a larger size than the body of the sipe. Increasing the size of the teardrop radius increases end of service traction, but decreases rigidity in the tread block. This decrease in rigidity is because there is more void in the tread block so that material between the teardrop and the upper surface is much less rigid. A decrease in rigidity results in a greater risk of irregular wear due to more micro sliding every time the tread block rolls through the contact patch. The decrease in rigidity has a negative impact in that wear performance is reduced, and rolling resistance performance is reduced. Another way of minimizing or eliminating cracking at the bottom of the sipe is to move the bottom of the sipe up in the thickness direction so that it is closer to the upper surface of the tread, thus making the sipe not as deep overall as it otherwise would have been. However, moving the sipe up closer to the upper surface of the tread decreases end of service traction associated with the sipe. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
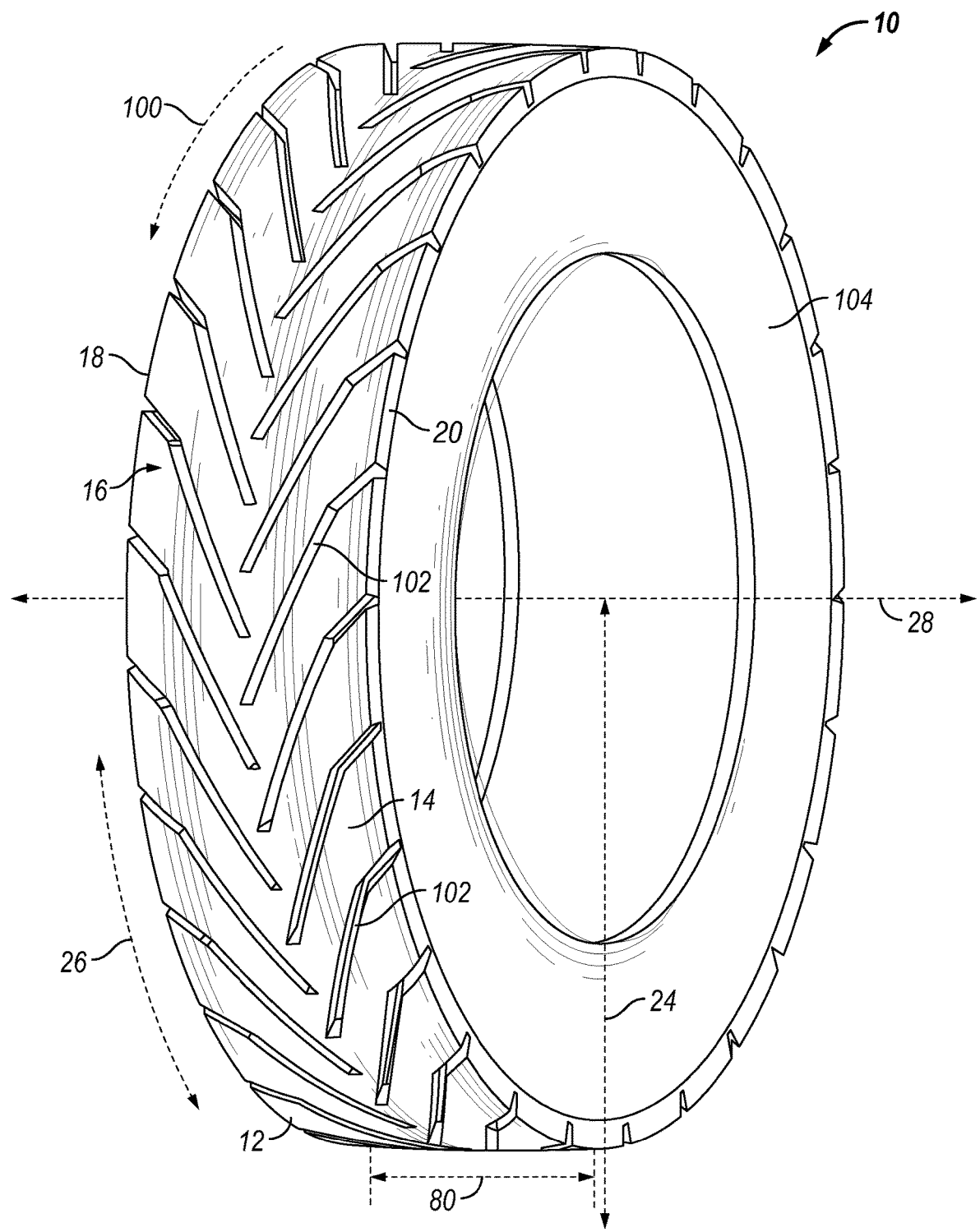
FIG. 1 is a perspective view of a tire with a tread that has angled ribs and grooves.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a turn around sipe 22 design for a tread 12 of a heavy truck tire 10 that reduces or eliminates crack propagation while at the same time maintaining rigidity and end of life performance. The turn around sipe 22 is configured into five segments 30, 42, 54, 66, 78 that are contiguous so that the sipe 22 extends outboard in a lateral direction 28, turns around, and then extends inboard in the lateral direction 28. The first segment 30 is oriented at a first segment angle 38 that is larger than a second segment angle 50 of a contiguous second segment 42. Likewise, a third segment 54 is oriented at a third segment angle 62 that is greater than a fourth segment angle 74 of a fourth segment 66 that is contiguous to the third segment 54. The fifth segment 78 is contiguous with both the second and fourth segments 42, 66 and is located within a 20% length 82 of the rolling tread width 80 from the first tread edge 18. In other embodiments, the length 82 is from 20%-30% of the rolling tread width 80 from the first tread edge 18, and in yet other embodiments the length 82 is 30% of the rolling tread width 80 from the first tread edge 18. The turn around sipe 22 creates a geometry that reduces or eliminates crack propagation/formation. With the geometry provided, the overall depth of the sipe 22 in the thickness direction 24 does not need to be moved up to the upper surface 16, and the cross-sectional size of the teardrop 90 of the sipe 22, if present, does not need to be increased.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. In a preferred embodiment, the tire 10 that includes the turn around sipe 22 as used herein is a drive tire of a tractor of a tractor trailer, however the sipe 22 is not shown in FIG. 1. The tire 10 includes a sidewall 104 onto which a tread 12 is disposed thereon. The central axis of the tire 10 extends through the center of the sidewall 104, and the lateral/axial direction 28 of the tire 10 is parallel to the central axis. The thickness direction 24, which is also known as the radial direction 24, of the tire 10 is perpendicular to the central axis, and the tread 12 is located farther from the central axis in the thickness direction 24 than the sidewall 104. The tread 12 extends all the way around the sidewall 104 in the circumferential direction 26 of the tire 10 and circles the central axis 360 degrees. The tread 12 has a series of ribs 14 and grooves 102 that are oriented at an angle so as to extend in both the circumferential direction 26 and the lateral direction 28.

Figure 2:
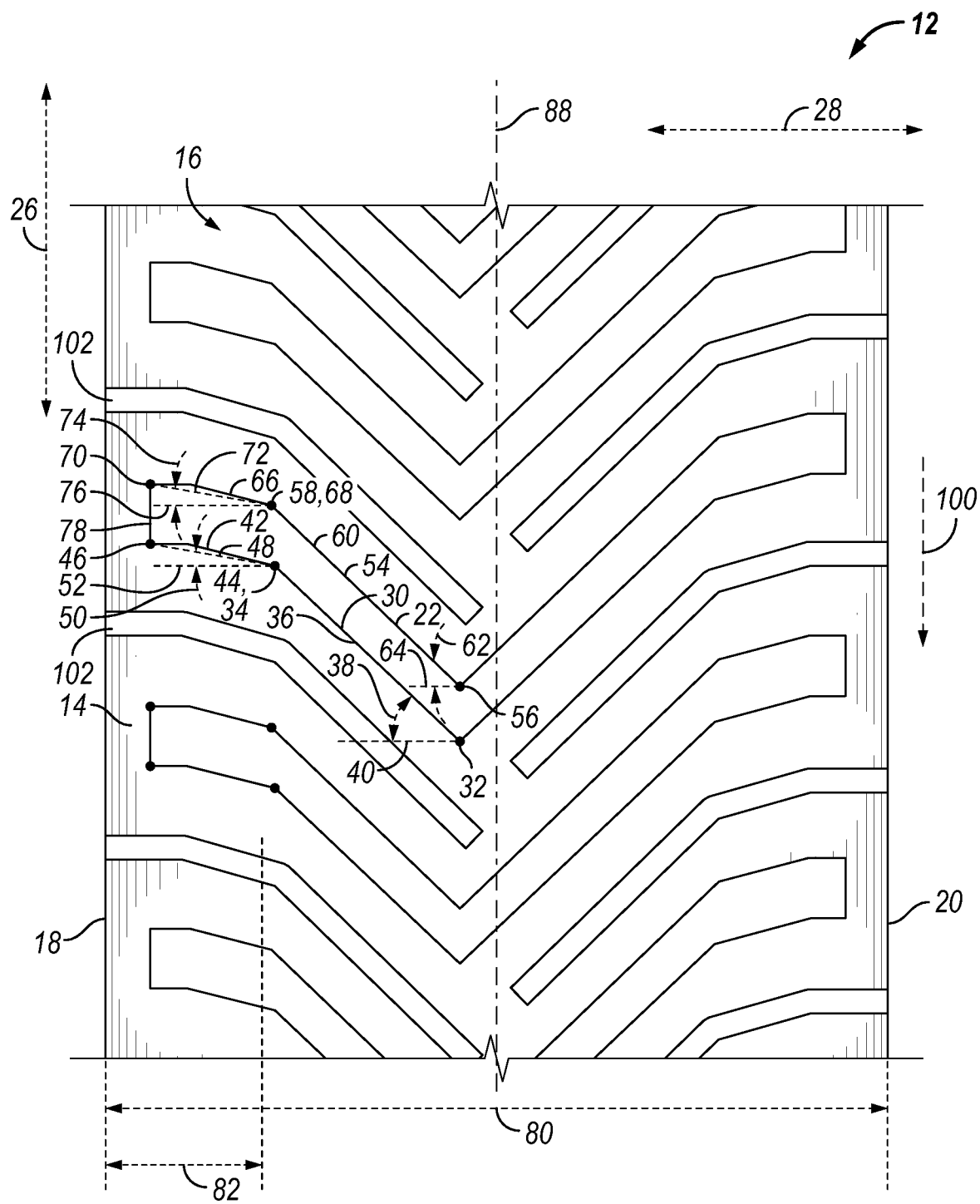
FIG. 2 is a top view of tread that includes a turn around sipe in accordance with one exemplary embodiment.

With reference now to FIG. 2, a top view of the tread 12 is provided that includes the turn around sipe 22 which is a structural feature that can reduce tearing or crack initiation and propagation. The sipes 22 are thin grooves/cuts in the tread 12. The sipes 22 at the upper surface 16 of the tread 12 may have widths that are two millimeters or less. The sipe 22 has a body that extends from the upper surface 16 down into the tread 12 in the thickness direction 24, and the body has a width that is likewise 2 millimeters or less. At the bottom of the body, a teardrop 90 may be included in the sipe 22. The teardrop 90 may be less than two millimeters or may be greater than or equal to two millimeters in cross-sectional size or diameter. The tread 12 includes grooves 102 that extend in both the lateral direction 28 and the circumferential direction 26 and are spaced from one another along the circumferential direction 26. Ribs 14 are between the grooves 102 and likewise extend in both the circumferential and lateral directions 26, 28. The turn around sipes 22 are located in the angled ribs 14.

The tread 12 has a first tread edge 18 on one end and a second tread edge 20 located on an opposite end in the lateral direction 28. The rolling tread width 80 extends from the first tread edge 18 to the second tread edge 20 in the lateral direction 28, and is the portion of the tread 12 that engages the ground during use of the tire 10. A lateral midpoint 88 is defined as the midpoint in the lateral direction 28 such that one half of the tread 12 is between the first tread edge 18 and the lateral midpoint 88, and so that the other half of the tread 12 is between the lateral midpoint 88 and the second tread edge 20. A 20% length 82 is defined as being 20% of the length of the rolling tread width 80 in the lateral direction 82. As such, length 82 is 20% of the length 80. The 20% length 82 begins at the first tread edge 18 and extends inboard in the lateral direction 28 towards the lateral midpoint 88 so as to extend along 20% of the length 80. The 20% length 82 thus does not reach the lateral midpoint 88 which would be 50% of the length of 80 from the first tread edge 18. In other embodiments, the 20% length 82 could be changed to be instead a 30% length 82 in which length 82 is 30% of the length 80.

The turn around sipe 22 is positioned on the tread 12 so that it does not engage the first tread edge 18 but is instead spaced from and free from engagement with the first tread edge 18 in the lateral direction 28. The turn around sipe 22 is positioned proximate to the first tread edge 18 so that the fifth segment 78 is located within the 20% length 82. In some instances, the entire fifth segment 78 is located within the 20% length 82. Other portions of the sipe 22 such as the second and fourth segments 42 and 66 may be both inside and outside of the 20% length 82, and other portions of the sipe 22 such as the first and third segments 30, 54 are completely outside of the 20% length 82.

The sipe 22 includes a first segment 30 that is a portion of the sipe 22 and includes a first segment inboard point 32 that is the point of the first segment 30 that is farthest from the first tread edge 18 in the lateral direction 28. The first segment 30 also has a first segment outboard point 34 that is the portion of the first segment 30 that is closest to the first tread edge 18. A first segment line 36 is defined as being a straight line that extends from the first segment inboard point 32 to the first segment outboard point 34. The entire first segment 30 extends in a straight line in FIG. 2, so the first segment line 36 overlays completely the entire first segment 30. Also illustrated in FIG. 2 is a first segment lateral line 40 that extends completely in the lateral direction 28 with no component of extension in the circumferential direction 26. The first segment lateral line 40 extends through the first segment inboard point 32. A first segment angle 38 is defined as being between the first segment lateral line 40 and the first segment line 36, and this first segment angle 38 is less than 90 degrees. The first segment angle 38 may be 45 degrees, from 40-50 degrees, 65 degrees, from 60-70 degrees, from 35-55 degrees or any degree less than 90 degrees in accordance with different embodiments, however the first segment angle 38 is greater than 0 degrees.

The turn around sipe 22 has a second segment 42 that is contiguous with the first segment 30. The second segment 42 as with the first segment 30 extends both in the circumferential and lateral directions 26, 28. The second segment 42 has a second segment inboard point 44 that is the portion of the second segment 42 that is the most inboard in the lateral direction 28. The second segment inboard point 44 is coincident with the first segment outboard point 34 such that these two points 34, 44 lay on top of one another. The second segment 42 also has a second segment outboard point 46 which is the outboard most portion of the second segment 42 in the lateral direction 28. A second segment line 48 extends from the second segment inboard point 44 to the second segment outboard point 46. The second segment 42 has a slight curve to it and the second segment line 48 does not lay exactly along the second segment 42. A second segment lateral line 52 extends completely in the lateral direction 28 and extends through the second segment inboard point 44. A second segment angle 50 is measured from the second segment lateral line 52 to the second segment line 48 and is less than 90 degrees. The second segment angle 50 may be 20 degrees, from 15-25 degrees, from 10-30 degrees, or other degrees in other embodiments. The second segment angle 50 may be greater than 0 degrees. The magnitude of the second segment angle 50 is less than the magnitude of the first segment angle 38.

The third segment 54 of the sipe 22 has a third segment inboard point 56 which is the most inboard portion of the third segment 54 in the lateral direction 28. The third segment 54 also has a third segment outboard point 58 that is the most outboard portion of the third segment 54. A third segment line 60 extends from the third segment inboard point 56 to the third segment outboard point 58. The third segment 54 is linear and the third segment line 60 completely overlays the third segment 54. A third segment lateral line 64 extends completely in the lateral direction 28 and through the third segment inboard point 56. A third segment angle 62 is less than 90 degrees and is measured from the third segment lateral line 64 to the third segment line 60. The third segment angle 62 may be 45 degrees, from 40-50 degrees, 65 degrees, from 60-70 degrees, from 35-55 degrees or any degree less than 90 degrees in accordance with different embodiments, however the third segment angle 62 is greater than 0 degrees.

The sipe 22 also has a fourth segment 66 that is contiguous with the third segment 54 and extends in both the circumferential and lateral directions 26, 28. The fourth segment 66 has a fourth segment inboard point 68 that is coincident with the third segment outboard point 58 and is the portion of the fourth segment 66 that is located the most inboard in the lateral direction 28. The fourth segment 66 has a fourth segment outboard point 70 that is the most outboard portion of the fourth segment 66 in the lateral direction 28. A fourth segment line 72 extends from the fourth segment inboard point 68 to the fourth segment outboard point 70. The fourth segment line 72 does not completely overlay the fourth segment 66 as the fourth segment 66 changes direction slightly along its length so that it is not completely linear in the top view of FIG. 2. A fourth segment lateral line 76 extend through the fourth segment inboard point 68 and is completely oriented in the lateral direction 28. The fourth segment angle 74 is measured from the fourth segment lateral line 76 to the fourth segment line 72. The fourth segment angle 74 may be 20 degrees, from 15-25 degrees, from 10-30 degrees, or other degrees in other embodiments. The fourth segment angle 74 may be greater than 0 degrees. The magnitude of the third segment angle 62 is greater than the magnitude of the fourth segment angle 74.

The fifth segment 78 of the sipe 22 is contiguous with both the second segment 42 and the fourth segment 66 and extends from the second segment outboard point 46 to the fourth segment outboard point 70. The entire fifth segment 78 is within the 20% length 82, although in other embodiments only a portion of the fifth segment 78 need be within the 20% length 82. In some embodiments, the majority of the fifth segment 78 is within the 20% length 82. The fifth segment 78 may extend completely in the circumferential direction 26 with no component in the lateral direction 28, or in different arrangements the fifth segment 78 may be configured so that it has a component of extension in both the circumferential direction 26 and the lateral direction 28.

In some embodiments, the first segment angle 38 is of a magnitude that is the same as the magnitude of the third segment angle 62, and the second segment angle 50 is of the same magnitude as that of the fourth segment angle 74. All five segments 30, 42, 54, 66, 78 may be straight such that the first segment 30 and the third segment 54 are parallel to one another, and so that the second segment 42 is parallel to the fourth segment 66. In the embodiments where the segments are not straight, such as in FIG. 2 where the second and fourth segments 42, 66, the second segment line 48 can be parallel to the fourth segment line 72. Further, the first segment line 36 may be parallel to the third segment line 60. In other embodiments, none of the lines 36, 48, 60, 72 are parallel to one another, or only a pair of the lines are parallel and the other pair of lines are not parallel.

The angles 38, 50, 62, 74 can be arranged so that none of them have the same magnitude, or so that some of them do in fact share the same magnitude with one another. However, it will never be the case that all of the angles 38, 50, 62, 74 have the same magnitude. Although some of the sipe 22 is within the 20% length 82, it may be the case that portions of the sipe 22 are outside of the 20% length 82. The entire first segment 36 and third segment 54 may be outside the 20% length 82. In other embodiments, the entire sipe 22 is within the 20% length 82. The first segment inboard point 32 and the third segment inboard point 56 are both located outboard from the lateral midpoint 88 in the lateral direction 28. In other embodiments, the points 32, 56 may be located at the lateral midpoint 88, or extend beyond the lateral midpoint 88. The sipe 22 as shown in FIG. 2 extends beyond the first and third segments 36, 54 past the lateral midpoint 88 and to a position proximate to the second tread edge 20. However, the sipe 22 does not engage the second tread edge 20 and is thus spaced from and free from engagement with the second tread edge 20. The sipe 22 could also be described as having the four segments 36, 42, 54, 66 on the right hand side of the sipe 22 which is unlabeled and thus the sipe 22 has a turn around feature on both of its lateral ends. The tread 12 may include a plurality of sipes 22 in which some or all of them have a turn around feature, and some or all of them may have turn around features both lateral ends as shown in FIG. 2. In other embodiments, the tread 12 will have sipes that do not have the turn around feature, or may be arranged so that they have the turn around feature on one lateral end but not the other. The grooves 102 extend in from the tread edges 18, 20 but do not extend as far inboard so as to engage the lateral midpoint 88. Although a single sipe 22 in each rib 14 is disclosed, other embodiments are possible in which a plurality of sipes 22 that have the turn around feature are within each one of the ribs 14.

The tread 12 is directional in that the tire 10 that includes the tread 12 is designed to roll primarily in one direction. The arrangement of the features such as the grooves 102, ribs 14, and sipes 22 may facilitate the directional properties of the tread 12. With respect to the circumferential direction 26, the rolling direction 100 is shown which the direction the tread 12 is designed to roll during use of the tire 10. However, it is to be understood that tire 10 could travel in the direction opposite to the rolling direction 100 during certain times such as when the vehicle is backing up. The turn around sipe 22 is positioned relative to the rolling direction 100 so that the first segment 36 is forward from the second segment 42 in the rolling direction 100. The third segment 54 is forward from the fourth segment 66 in the rolling direction 100. Also, the first and second segments 36, 42 are forward of the third and fourth segments 54, 66 in the rolling direction 100. The first segment inboard point 32 may be the portion of the five segments 35, 42, 54, 66, 78 that is the most forward in the rolling direction 100. In some embodiments, the first segment inboard point 32 is the forward most portion of the sipe 22 in the rolling direction 100.

Figure 3:
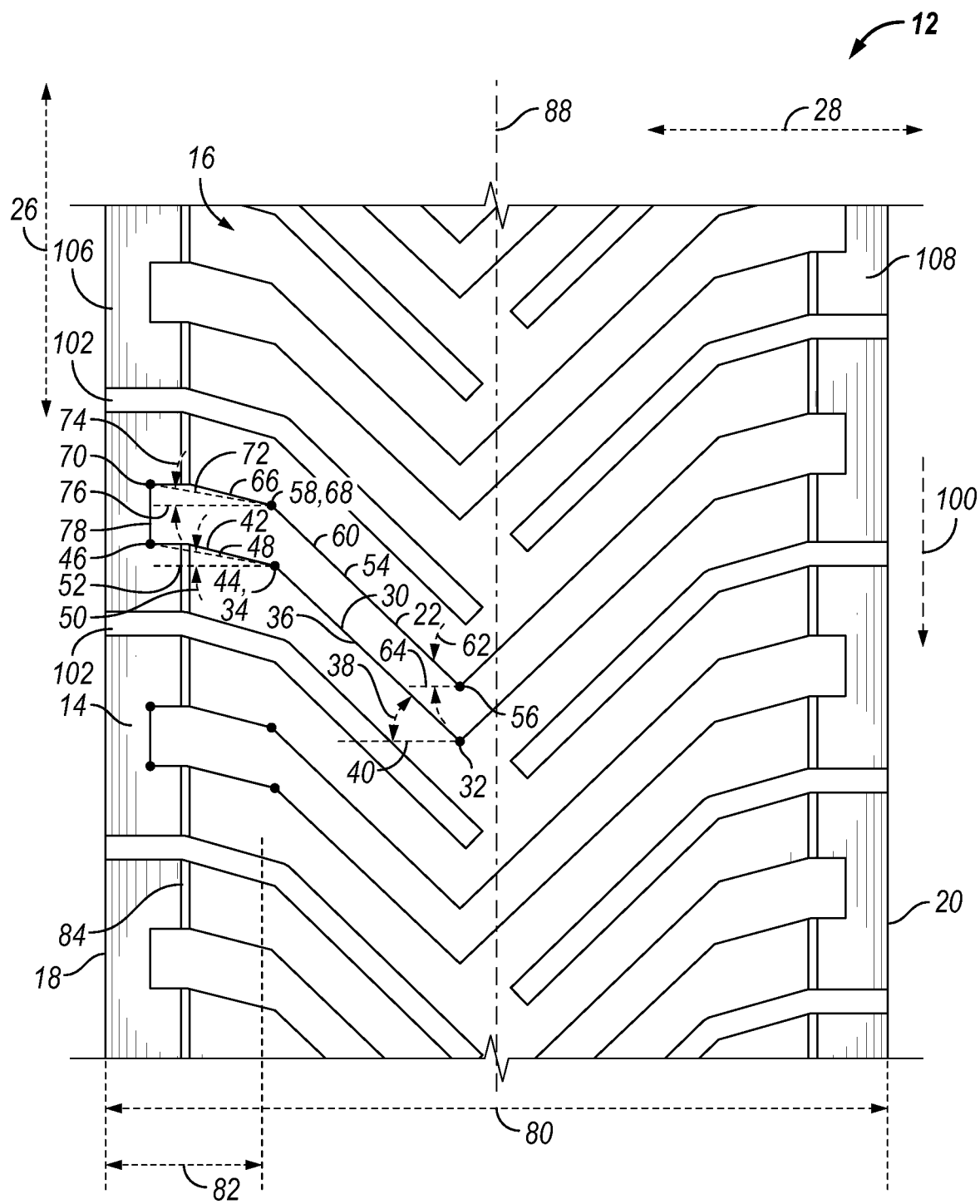
FIG. 3 is a top view of tread that includes a turn around sipe that engages a decouple groove.

FIG. 3 shows an alternate embodiment in which the turn around sipe 22 is configured the same as that previously disclosed with respect to FIG. 2, and a repeat of this information is not necessary. The tread 12 differs in that decoupling grooves 84 are present proximate to both side edges 18, 20. The decoupling groove 84 decouples the shoulder rib 106 from the center rib of the tread 12. Likewise, the decoupling groove (unlabeled) on the right hand side decouples the shoulder rib 108 from the center rib of the tread 12. The decoupling groove 84 is arranged in the circumferential direction 26 with no component of extension in the lateral direction 28, and engages the grooves 102. Additionally, the decoupling groove 84 engages the turn around sipe 22 at the second segment 42 and at the fourth segment 66. The decoupling groove 84 is free from engagement with the first segment 36, third segment 54, and fifth segment 78. The decoupling groove 84 is discontinuous across the turn around sipe 22 so that it does not extend from the second segment 42 to the fourth segment 66. As such, the upper surface 16 of the tread 12 is continuous at all points within the perimeter formed by the sipe 22.

Figure 4:
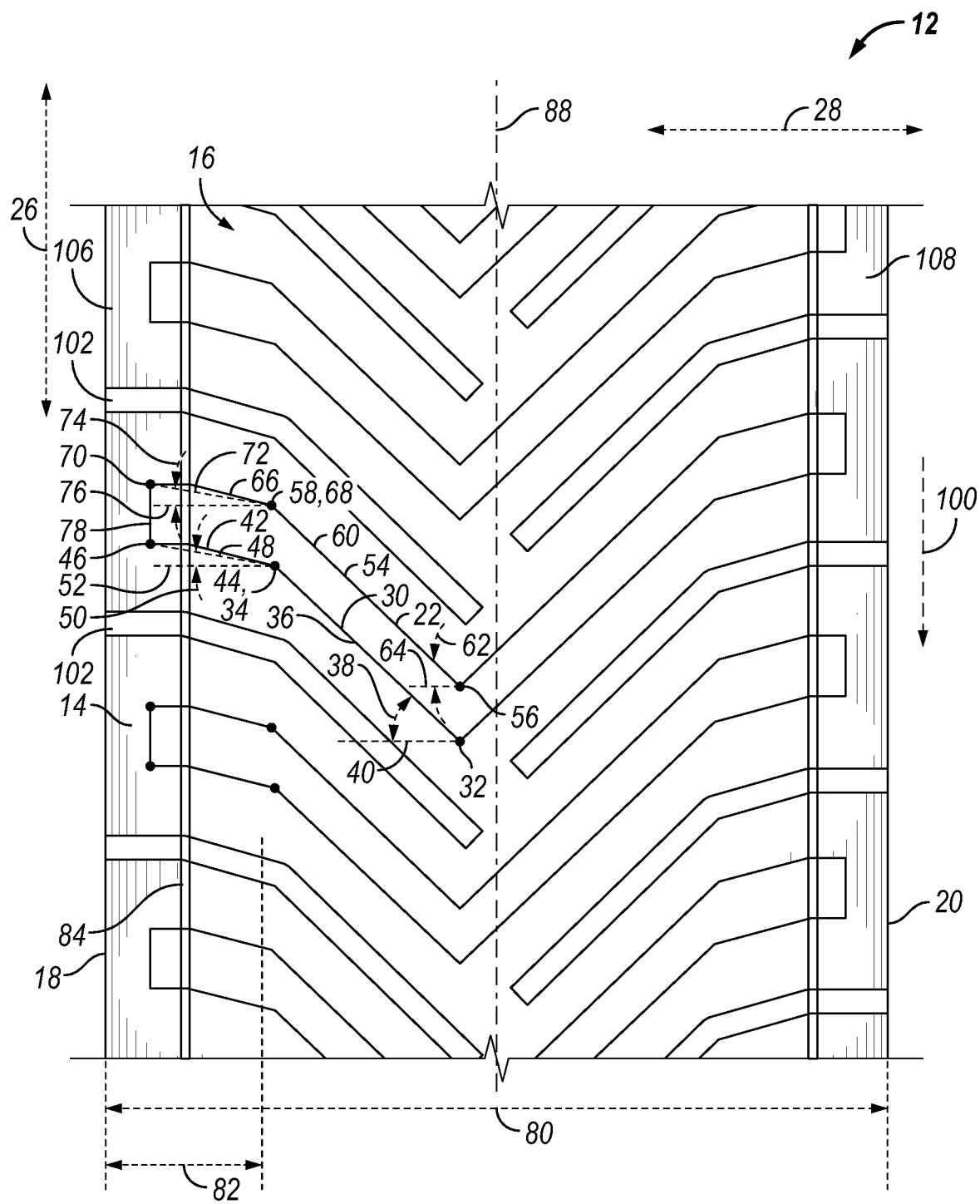
FIG. 4 is a top view of tread that has a turn around sipe with a decouple groove that extends between segments of the turn around sipe.

Another exemplary embodiment of the tread 12 is shown in FIG. 4 which is similar to that of FIGS. 2 and 3 and thus a repeat of the features of the tread 12 is not necessary. However, the arrangement in FIG. 4 differs from that of FIG. 3 in that the decoupling groove 84 is continuous around the entire circumference of the tire 10, at most being discontinuous within the grooves 102 and turn around sipe 22 which it engages. In this regard, the decoupling groove 84 engages the second segment 42 and extends to and engages the fourth segment 66. The upper surface 16 within the perimeter formed by the sipe 22 is thus discontinuous due to the presence of the decoupling groove. The center rib and the shoulder rib 106 are thus both present within the upper surface 16 that is within the perimeter of the sipe 22. The other decoupling groove (not labeled) likewise extends across the upper surface 16 bound by the sipe 22 so that both the center rib and the shoulder rib 108 are likewise present within the perimeter of the sipe 22.

Figure 5:
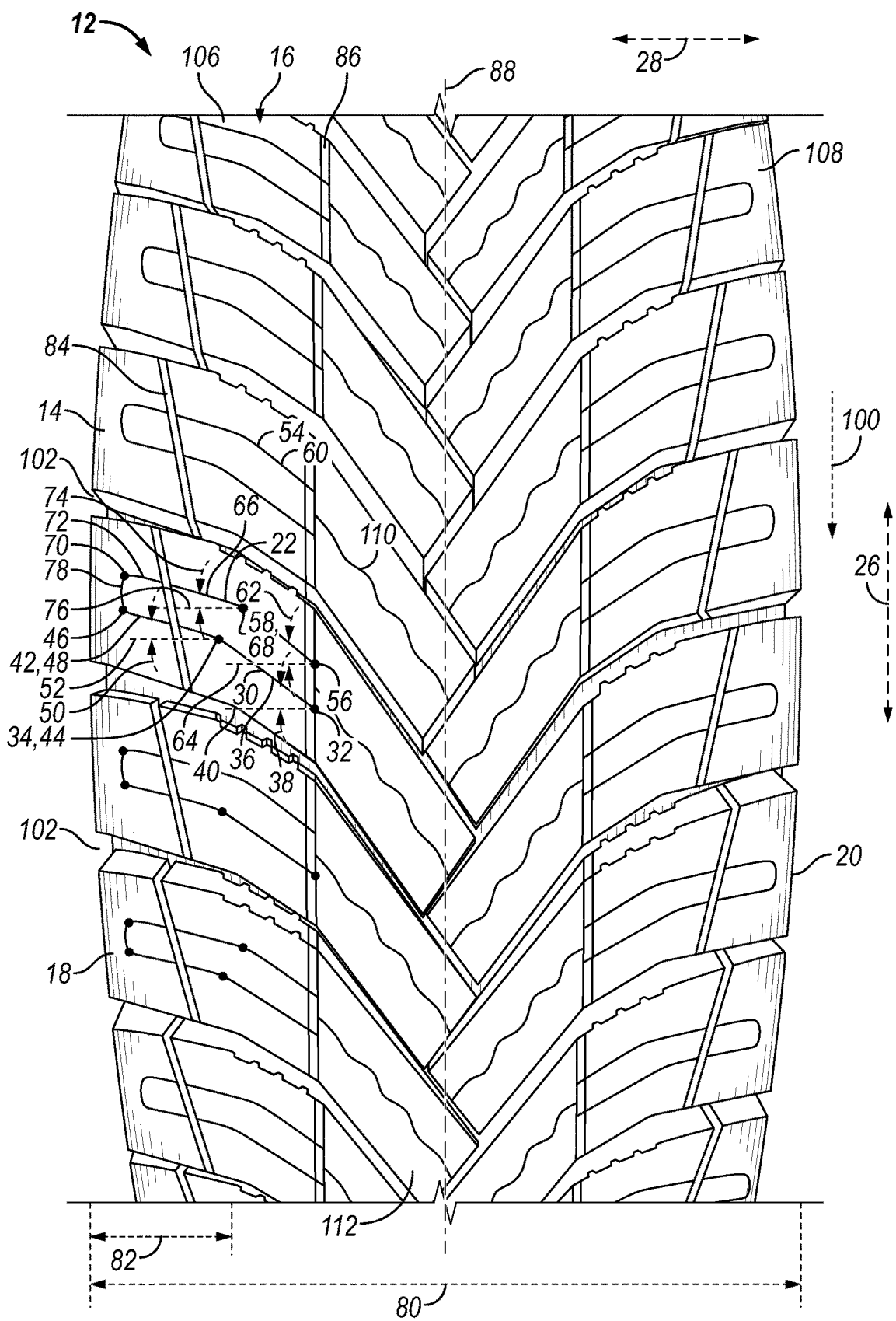
FIG. 5 is a top view of tread that has a turn around sipe that extends to a shoulder groove.

Another exemplary embodiment of the tread 12 is shown with reference to FIG. 5. The tread 12 has a center rib 112 and a shoulder rib 106 with a shoulder groove 86 separating the center rib 112 from the shoulder rib 106. The shoulder groove 86 is a circumferential groove that extends the entire circumference around the tire 10. There is another shoulder groove (unlabeled) that separates the center rib 112 from the shoulder rib 108 which is likewise oriented in the circumferential direction 26. The shoulder rib 106 has a portion that is decoupled via a decoupling groove 84. The decoupling groove 84 is broken up into multiple sections that each have components of extension in the lateral direction 28 and circumferential direction 26. The decoupling groove 84 engages the grooves 102 and functions to decouple the laterally outboard portion of the shoulder rib 106 from the laterally inboard portion of the shoulder rib 106. The rib 14 forms a portion of the shoulder rib 106 that is defined between two consecutive grooves 102, the shoulder groove 86, and the first tread edge 18. The turn around sipe 22 is located in the rib 14 and is thus located within the shoulder groove 106. The turn around sipe 22 is provided with first, second, third, fourth and fifth segments 30, 42, 54, 66, 78 in the same manner as previously discussed, and a repeat of this information is not necessary. One difference between the turn around sipe 22 of FIG. 2 and that in FIG. 5 is that the second and fourth segments 42, 66 are straight completely from their inboard points 44, 68 to their outboard points 46, 70. The grooves 102 as shown herein are parallel with the adjacent sipes 22 such that the grooves 102 have different segments some of which are parallel to the first and third segments 36, 54 and others of which are parallel to the second and fourth segments 42, 72. All of the variously illustrated embodiments in the figures are arranged in this manner with parallel sipes 22 and grooves 102. However, other embodiments exist in which the entire grooves 102 are not parallel with the sipes 22, or in which some parts of the grooves 102 are parallel with some or all of the sipes 22 and other parts of the grooves 102 are not parallel with all of the sipes 22.

The first segment inboard point 32 and the third segment inboard point 56 are located at the shoulder groove 86. The fifth segment 78 is spaced from the first tread edge 18 and is not in contact therewith. The entire fifth segment 78 and the decoupling groove 84 are both contained entirely within the 20% length 82. The decoupling groove 86 is outside of the 20% length 82. The points 44, 34 may be within the 20% length 82, and the points 58, 68 may be outside of the 20% length 82, but in other embodiments the various points 34, 44, 58, 68 could be inside or outside of the 20% length 82. The decoupling groove 84 engages both the second segment 42 and the fourth segment 66 and extends completely from the second segment 42 to the fourth segment 66 so that the upper surface 16 defined within the perimeter of the sipe 22 is discontinuous inboard and outboard of the decoupling groove 84 in the lateral direction 28. The fifth segment 78 is located within the portion of the rib 14 that is decoupled by the decoupling groove 86.

The sipe 22 ends at the shoulder groove 86 and does not extend inboard beyond the shoulder groove 86 in the lateral direction 28. The rib 14 continues on beyond the shoulder groove 86 inboard in the lateral direction 28 to a point slightly past the lateral midpoint 88 in the lateral direction 28 at which point it terminates by encountering a groove 102 extending inboard from the second tread edge 20. A sipe 110 extends in the rib 14 from the shoulder groove 86 to the end of the rib 14 which terminates at the previously mentioned groove 102. This sipe 110 is wavy in shape and is not part of the turn around sipe 22 in the rib 14. There is no portion of the turn around sipe 22 between the shoulder groove 86 and the lateral midpoint 88. The right hand side of the tread 12 is arranged in a similar manner and thus a repeat of this information is not necessary.

Figure 6:
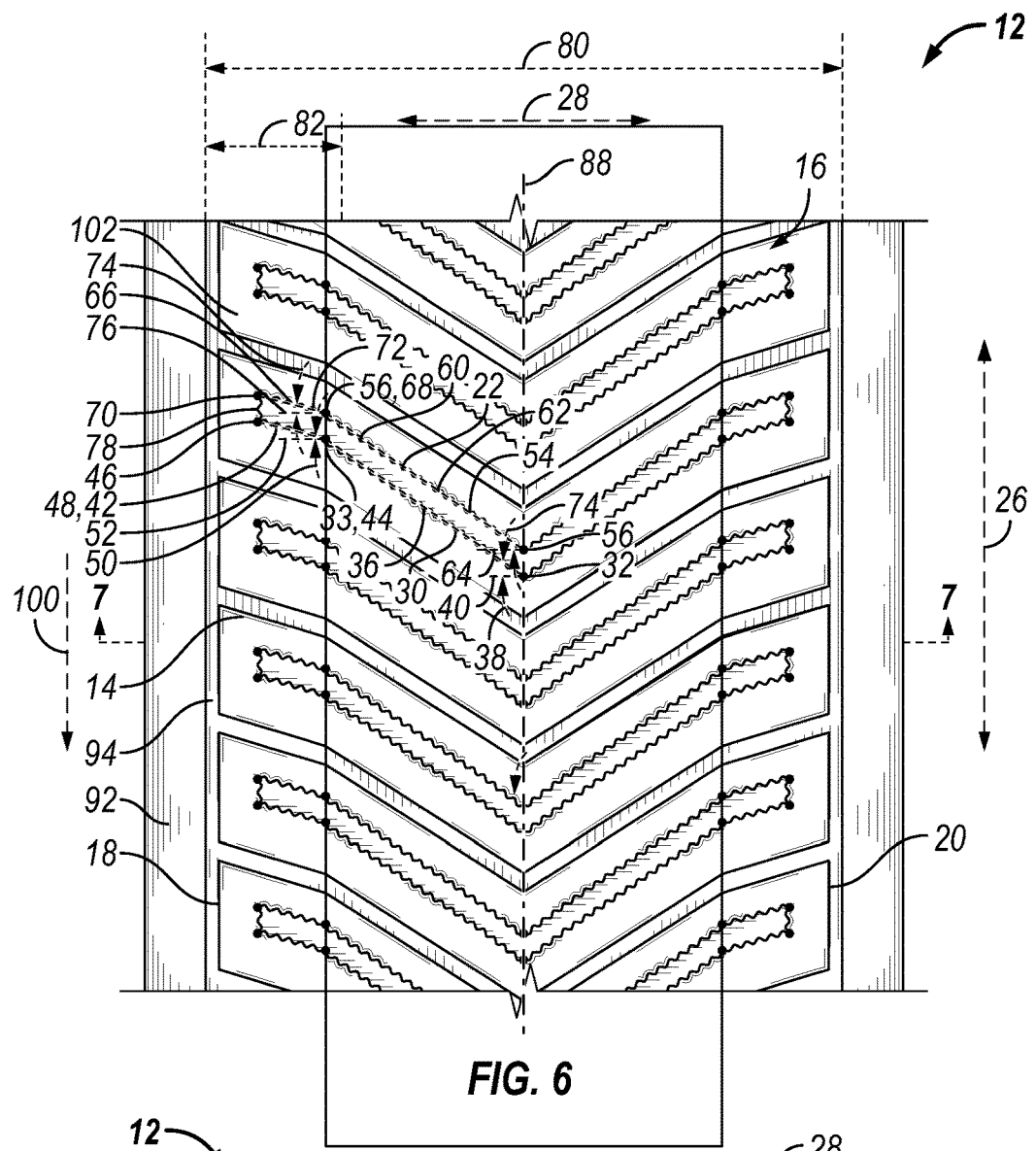
FIG. 6 is a top view of tread that has a turn around sipe that extends to a lateral midpoint of the tread.
Figure 7:
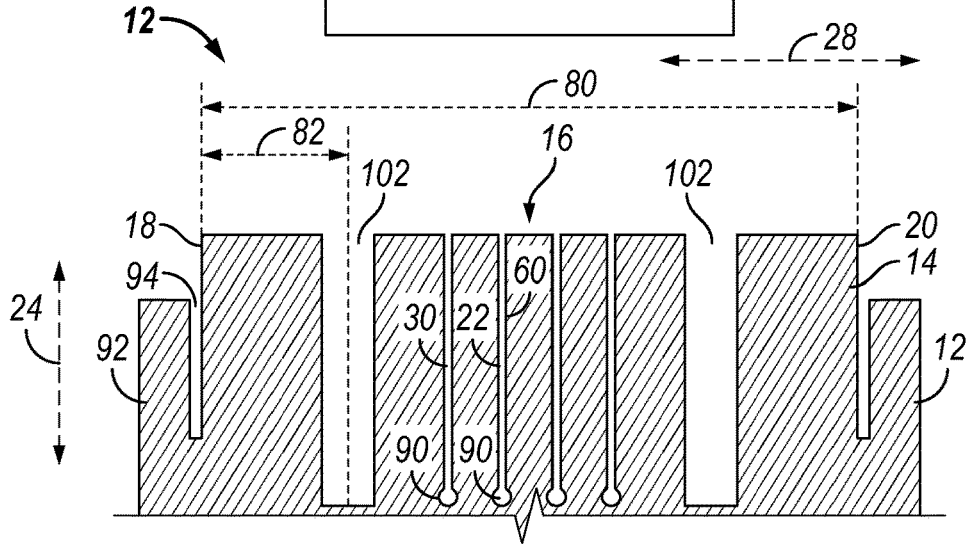
FIG. 7 is a cross-section view taken along line 7-7 of FIG. 6.

Another arrangement of the tread 12 is shown with reference to FIGS. 6 and 7 in which the turn around sipe 22 is configured with the five segments 30, 42, 54, 66, 78 as previously discussed. However, the turn around sipe 22 is not straight but includes segments 30, 42, 54, 66, 78 that are wavy in shape. In other embodiments, the segments 30, 42, 54, 66, 78 can be variously shaped such as being zig-zag, angled, wavy, straight, or curved. The lines 40, 48, 60, 72 may still be straight regardless of whether the segments 30, 42, 54, 66 are not straight. The tread 12 includes a sacrificial rib 92 on both sides of the tread 12 in the lateral direction 28. The sacrificial rib 92 is not included within the rolling tread width 80 and thus is laterally outboard of the 20% length in the lateral direction 28. The sacrificial rib 92 protects the shoulder of the tread 12 from abnormal wear, and has an upper surface that is located lower than the upper surface 16 in the thickness direction 24. The turn around sipe 22 is not located within the sacrificial rib 92, and again ends short of the first tread edge 18 so that the turn around sipe 22 is spaced from and not in engagement with the first tread edge 18. The first and third segments 30, 54 end at the lateral midpoint 88 such that the first segment inboard point 32 and the third segment inboard point 56 are both located at the lateral midpoint 88. Teardrops 90 are located at the bottom of the sipe 22 in the thickness direction 24 and have a circular cross-sectional shape.

The sipe 22 continues past the lateral midpoint 88 and forms another turn around sipe 22 on the right hand side of the tread 12 which terminates short of the second tread edge 20 and spaced therefrom in the lateral direction 28. The sacrificial rib on the right hand side is configured the same way as the sacrificial rib 92 previously described.

Figure 8:
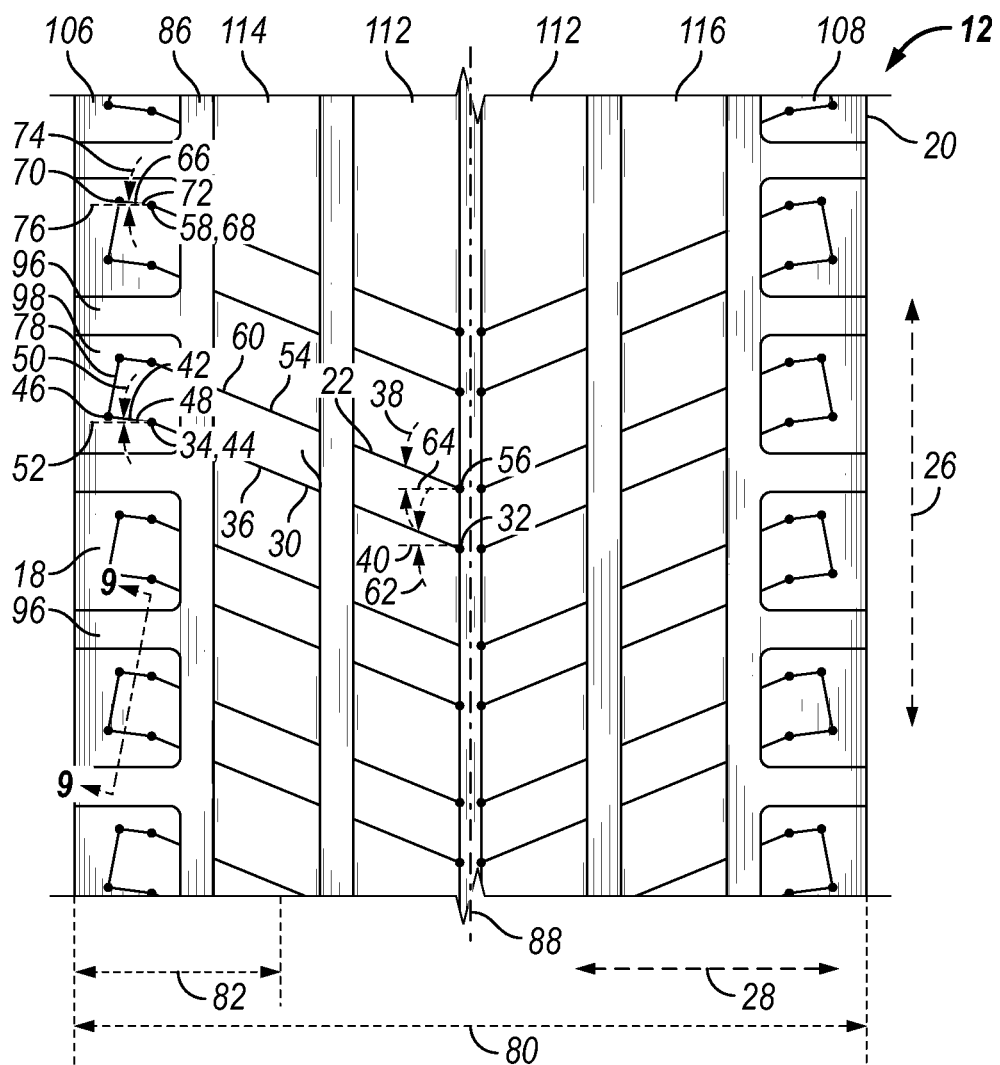
FIG. 8 is a top view of tread that has a turn around sipe in circumferential ribs.
Figure 9:
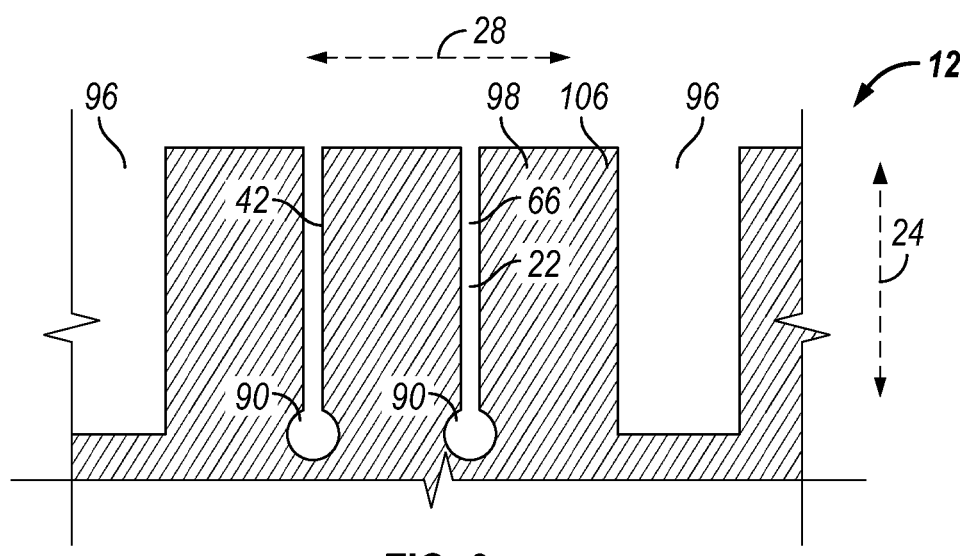
FIG. 9 is a cross-section view taken along line 9-9 of FIG. 8.

Another embodiment of the tread 12 is shown with reference to FIGS. 8 and 9 in which the ribs 14 are not angled as in previous embodiments. The tread 12 includes a center groove that extends in the circumferential direction in which the lateral midpoint 88 is located therein. The tread includes a pair of center ribs 112 on either side of the center groove in the lateral direction 28. An intermediate rib 114 is located between a shoulder rib 106 and the left center rib 112. An intermediate rib 116 is located between the right center groove 112 and the shoulder rib 108. The shoulder groove 86 separates the shoulder rib 106 from the intermediate rib 114, and a counterpart shoulder groove likewise separates the intermediate rib 116 from the shoulder rib 108. The turn around sipe 22 can be configured with the five segments 30, 42, 54, 66, 78 as previously described and a repeat of this information is not necessary. The inboard points 32, 56 are located at the center groove at the left hand center rib 112. The entire shoulder rib 106 is within the 20% length 82, and the entire first and third segments 30, 54 are straight along their entire lengths, with the outboard points 34, 58 being within the 20% length 82. The first and third segments 30, 54 extend completely across the entire left hand center groove 112 and the intermediate rib 114.

The shoulder rib 106 includes a plurality of block grooves 96 that extend in the lateral direction 28, with no component of extension in the circumferential direction 26, and open into the first tread edge 18. A shoulder rib block 98 is located between successive block grooves 96 and the turn around sipe 22 is located within the shoulder rib block 98 so that the entire second segment 42, fourth segment 66, and fifth segment 78 are completely within the shoulder rib block 98, and so that minority portions of the first and third segments 30, 54 are within the shoulder rib block 98. The shoulder rib block 98 has a square shape, but could be rectangular or variously shaped in accordance with other exemplary embodiments. The turn around sipe 22 has a teardrop 90 at its bottom which is at the same position in the thickness direction 24 as the bottom of the block grooves 96. The teardrop can have the same size and shape along all five segments 30, 42, 54, 66, 78 or may be differently sized and/or shaped or not even present in one or more of the segments 30, 42, 54, 66, 78.

Although shown incorporated into a shoulder rib 106 that has a block design in which block grooves 96 are present in the shoulder rib 106, the turn around sipe 22 can also be used with a tread 12 that features a shoulder rib 106 that is a solid shoulder rib 106 that does not have block grooves 96 in it, and consequently is not broken up into a plurality of shoulder rib blocks 98. By being present within the shoulder rib 106, it is to be understood that this means at least the fifth segment 78 is present within the shoulder rib 106.

In the various embodiments, the first and third segment lines 36, 60 can be longer than the second and fourth segment lines 48, 72. The fifth segment 78 may be the shortest segment of the entire turn around sipe 22 such that the fifth segment 78 is shorter than the other segments 30, 42, 54, 66. The first and third segment lines 36, 60 may each be 5 millimeters or longer in some embodiments. The second and third segment lines 48, 72 may be each 3 millimeters or longer in some embodiments. The fifth segment 78 may be 3 millimeters in length or longer in some embodiments. The five segments 30, 42, 54, 66, 78 may make up the entire turn around sipe 22, or there may be other segments in addition to the five segments 30, 42, 54, 66, 78 that make up the rest of the sipe 22 as for example the FIG. 4 embodiment in which the sipe 22 has other portions to it besides just the five segments designed as segments 30, 42, 54, 66, 78.

The provision of the turn around sipe 22 with the fifth segment 78 in the 20% length 82 causes the end of life traction to not be compromised, and minimizes impact to rolling resistance and wear. The aforementioned placement of the fifth segment 78 with the rest of the turn around sipe 22 minimizes shoulder bottom groove cracking when the sipe 22 has a teardrop 90 such that the teardrop 90 is present within the shoulder rib 106 or otherwise within the 20% length 82. Although described as having the fifth segment 78 within the 20% length 82, other embodiments of the tread 12 exist in which the 20% length is instead a 10% length such that the entire fifth segment 78 is within 10% of the rolling tread width 80 to the first tread edge 18. The turn around shape of the sipe 22 in addition to the orientation of the angles 38, 50, 62, 74 allows for the benefits of having a sipe 22 proximate to the tread edge 18 and/or within a shoulder rib 106, while reducing or in some cases eliminating the negative consequences of having a sipe in the shoulder rib 106. The turn around sipe 22 may be arranged so that it does not open into the shoulder such that it does not extend to the first tread edge 18 (or second tread edge 20). As the turn around sipe 22 is not exposed in this manner to the outside of the tread 12, the geometry may provide better resistance to aggression, which may be defined as cracking at the bottom of the sipe 22, that can be induced by impact or scrub. The sipe 22 can thus be more durable.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire tread that has a lateral direction, a thickness direction, and a circumferential direction, comprising:
   a sipe that has a first segment that extends forward in the circumferential direction and outboard in the lateral direction, wherein the first segment has a first segment inboard point and a first segment outboard point and a first segment line that extends from the first segment inboard point to the first segment outboard point, wherein a first segment angle is less than 90 degrees and is measured between a first segment lateral line and the first segment line, wherein the first segment lateral line extends completely in the lateral direction and extends through the first segment inboard point, wherein the first segment inboard point is the farthest inboard position of the first segment in the lateral direction, and wherein the first segment outboard point is the farthest outboard position of the first segment in the lateral direction;

a second segment that extends forward in the circumferential direction and outboard in the lateral direction, wherein the second segment has a second segment inboard point coincident with the first segment outboard point, wherein the second segment has a second segment outboard point that is a farthest outboard position of the second segment in the lateral direction, wherein the second segment has a second segment line that extends from the second segment inboard point to the second segment outboard point, wherein a second segment angle is less than 90 degrees and is measured between a second segment lateral line and the second segment line, wherein the second segment lateral line extends completely in the lateral direction and extends through the second segment inboard point;

wherein the first segment angle is greater than the second segment angle;

a third segment that extends forward in the circumferential direction and outboard in the lateral direction, wherein the third segment has a third segment inboard point and a third segment outboard point and a third segment line that extends from the third segment inboard point to the third segment outboard point, wherein a third segment angle is less than 90 degrees and is measured between a third segment lateral line and the third segment line, wherein the third segment lateral line extends completely in the lateral direction and extends through the third segment inboard point, wherein the third segment inboard point is the farthest inboard position of the third segment in the lateral direction, and wherein the third segment outboard point is the farthest outboard position of the third segment in the lateral direction;

a fourth segment that extends forward in the circumferential direction and outboard in the lateral direction, wherein the fourth segment has a fourth segment inboard point coincident with the third segment outboard point, wherein the fourth segment has a fourth segment outboard point that is a farthest outboard position of the fourth segment in the lateral direction, wherein the fourth segment has a fourth segment line that extends from the fourth segment inboard point to the fourth segment outboard point, wherein a fourth segment angle is less than 90 degrees and is measured between a fourth segment lateral line and the fourth segment line, wherein the fourth segment lateral line extends completely in the lateral direction and extends through the fourth segment inboard point;

wherein the third segment angle is greater than the fourth segment angle;

a fifth segment that extends from the second segment outboard point to the fourth segment outboard point;

a first tread edge;

a second tread edge with a rolling tread width defined from the first tread edge to the second edge in the lateral direction, wherein the fifth segment is located within 20% of the length of the rolling tread width from the first tread edge, wherein the sipe is free from engagement with the first tread edge;

a rib that is not oriented completely in the circumferential direction so as to extend both in the circumferential direction and the lateral direction, wherein the sipe is located in the rib;

wherein the tread has a lateral midpoint that is located equal distance to the first tread edge and the second tread edge in the lateral direction, wherein the sipe extends from the first segment inboard point and then across the lateral midpoint and turns around and extends back again across the lateral midpoint to the third segment inboard point.

2. The tread as set forth in claim 1, further comprising a decoupling groove, wherein the decoupling groove engages the second segment and the fourth segment, wherein the decoupling groove is free from engagement with the first segment, the third segment, and the fifth segment, wherein the fifth segment is located outboard from the decoupling groove in the lateral direction.

3. The tread as set forth in claim 2, wherein the decoupling groove extends from the second segment to the fourth segment.

4. The tread as set forth in claim 1, further comprising a shoulder groove that extends in the circumferential direction, wherein the first segment inboard point is located at the shoulder groove, wherein the third segment inboard point is located at the shoulder groove.

5. The tread as set forth in claim 1, wherein the first segment angle is the same magnitude as the third segment angle, and wherein the second segment angle is the same as the fourth segment angle.

6. The tread as set forth in claim 1, wherein the first segment is straight and extends completely along the first segment line, wherein the second segment is straight and extends completely along the second segment line, wherein the third segment is straight and extends completely along the third segment line, wherein the fourth segment is straight and extends completely along the fourth segment line, and wherein the fifth segment is straight.

7. The tread as set forth in claim 1, wherein the first segment, the second segment, the third segment, the fourth segment, and the fifth segment are wavy.

8. The tread as set forth in claim 1, wherein the sipe has a teardrop that extends along the first segment, the second segment, the third segment, the fourth segment, and the fifth segment, wherein the teardrop has a circular cross-sectional shape and is located at the bottom of the sipe.

9. The tread as set forth in claim 1, further comprising a sacrificial rib that is located outboard from the first tread edge in the lateral direction, and wherein a sacrificial rib groove is located between the first tread edge and the sacrificial rib in the lateral direction.

10. The tread as set forth in claim 1, further comprising a shoulder rib that has a plurality of block grooves that cause the shoulder rib to be arranged as a plurality of shoulder rib blocks, wherein the fifth segment is located within one of the shoulder rib blocks, and wherein the sipe is spaced from and not in engagement with any of the block grooves.

11. The tread as set forth in claim 1, wherein the heavy truck tire tread is directional and has a rolling direction that extends in the circumferential direction, wherein the sipe is arranged relative to the rolling direction such that the first segment and the second segment are located forward of the third segment and the fourth segment in the rolling direction.

12. A heavy truck tire tread that has a lateral direction, a thickness direction, and a circumferential direction, comprising:

a sipe that has a first segment that extends forward in the circumferential direction and outboard in the lateral direction, wherein the first segment has a first segment inboard point and a first segment outboard point and a first segment line that extends from the first segment inboard point to the first segment outboard point, wherein a first segment angle is less than 90 degrees and is measured between a first segment lateral line and the first segment line, wherein the first segment lateral line extends completely in the lateral direction and extends through the first segment inboard point, wherein the first segment inboard point is the farthest inboard position of the first segment in the lateral direction, and wherein the first segment outboard point is the farthest outboard position of the first segment in the lateral direction;

a second segment that extends forward in the circumferential direction and outboard in the lateral direction, wherein the second segment has a second segment inboard point coincident with the first segment outboard point, wherein the second segment has a second segment outboard point that is a farthest outboard position of the second segment in the lateral direction, wherein the second segment has a second segment line that extends from the second segment inboard point to the second segment outboard point, wherein a second segment angle is less than 90 degrees and is measured between a second segment lateral line and the second segment line, wherein the second segment lateral line extends completely in the lateral direction and extends through the second segment inboard point;

wherein the first segment angle is greater than the second segment angle;

a third segment that extends forward in the circumferential direction and outboard in the lateral direction, wherein the third segment has a third segment inboard point and a third segment outboard point and a third segment line that extends from the third segment inboard point to the third segment outboard point, wherein a third segment angle is less than 90 degrees and is measured between a third segment lateral line and the third segment line, wherein the third segment lateral line extends completely in the lateral direction and extends through the third segment inboard point, wherein the third segment inboard point is the farthest inboard position of the third segment in the lateral direction, and wherein the third segment outboard point is the farthest outboard position of the third segment in the lateral direction;

a fourth segment that extends forward in the circumferential direction and outboard in the lateral direction, wherein the fourth segment has a fourth segment inboard point coincident with the third segment outboard point, wherein the fourth segment has a fourth segment outboard point that is a farthest outboard position of the fourth segment in the lateral direction, wherein the fourth segment has a fourth segment line that extends from the fourth segment inboard point to the fourth segment outboard point, wherein a fourth segment angle is less than 90 degrees and is measured between a fourth segment lateral line and the fourth segment line, wherein the fourth segment lateral line extends completely in the lateral direction and extends through the fourth segment inboard point;

wherein the third segment angle is greater than the fourth segment angle;

a fifth segment that extends from the second segment outboard point to the fourth segment outboard point;

a first tread edge;

a second tread edge with a rolling tread width defined from the first tread edge to the second edge in the lateral direction, wherein the fifth segment is located within 20% of the length of the rolling tread width from the first tread edge, wherein the sipe is free from engagement with the first tread edge;

a rib that is not oriented completely in the circumferential direction so as to extend both in the circumferential direction and the lateral direction, wherein the sipe is located in the rib;

wherein the tread has a lateral midpoint that is located equal distance to the first tread edge and the second tread edge in the lateral direction, wherein the first segment inboard point is located at the lateral midpoint, and wherein the third segment inboard point is located at the lateral midpoint.

\* \* \* \* \*